United States Patent [19]

Shigenaga

[11] Patent Number: 4,809,326
[45] Date of Patent: Feb. 28, 1989

[54] IC CARD SYSTEM

[75] Inventor: Yoshimi Shigenaga, Tokyo, Japan

[73] Assignee: Casio Computer Co., Ltd., Tokyo, Japan

[21] Appl. No.: 120,773

[22] Filed: Nov. 16, 1987

Related U.S. Application Data

[63] Continuation of Ser. No. 834,812, Feb. 28, 1986, abandoned.

[30] Foreign Application Priority Data

Mar. 5, 1985 [JP] Japan .................................. 60-43386

[51] Int. Cl.⁴ .............................................. H04L 9/00
[52] U.S. Cl. ...................................... 380/23; 380/25; 380/48
[58] Field of Search ................... 235/379–382, 235/382.5; 380/21, 23–25, 28, 48; 364/405

[56] References Cited

U.S. PATENT DOCUMENTS

| Re. 29,259 | 7/1977 | Sabsay | 380/23 |
|---|---|---|---|
| 3,821,704 | 6/1974 | Sabsay | 380/23 |
| 4,186,871 | 2/1980 | Anderson et al. | 380/25 |
| 4,213,118 | 7/1980 | Genest et al. | 380/23 |
| 4,218,738 | 8/1980 | Matyas et al. | 380/24 |
| 4,304,990 | 12/1981 | Atalla | 380/25 |
| 4,450,535 | 5/1984 | de Pommery et al. | 364/405 |
| 4,453,074 | 6/1984 | Weinstein | 235/381 |
| 4,484,025 | 11/1984 | Ostermann et al. | 380/21 |
| 4,529,870 | 7/1985 | Chaum | 235/380 |
| 4,558,175 | 12/1985 | Genest et al. | 380/23 |
| 4,594,663 | 6/1986 | Nagata et al. | 235/382.5 |
| 4,650,475 | 3/1987 | Kitchener | 235/380 |
| 4,709,136 | 11/1987 | Watanabe | 235/380 |
| 4,742,215 | 5/1988 | Daughters et al. | 235/487 |

FOREIGN PATENT DOCUMENTS

| 0049650 | 4/1982 | European Pat. Off. |
| 2526977 | 11/1983 | France |
| 2536928 | 6/1984 | France |
| 1279773 | 6/1972 | United Kingdom |

OTHER PUBLICATIONS

International Conference on Secure Communication Systems, Feb. 22–23, 1984.
IBM Technical Disclosure Bulletin, vol. 16, No. 7, Dec. 1973 (pp. 2312–2314).

Primary Examiner—Salvatore Cangialosi
Attorney, Agent, or Firm—Frishauf, Holtz, Goodman & Woodward

[57] ABSTRACT

Application program data is sent with decryption key code data from an initializing IC card to an application program RAM arranged in an IC card terminal. The terminal is then initialized, and customer IC card reception preparation is completed.

28 Claims, 6 Drawing Sheets

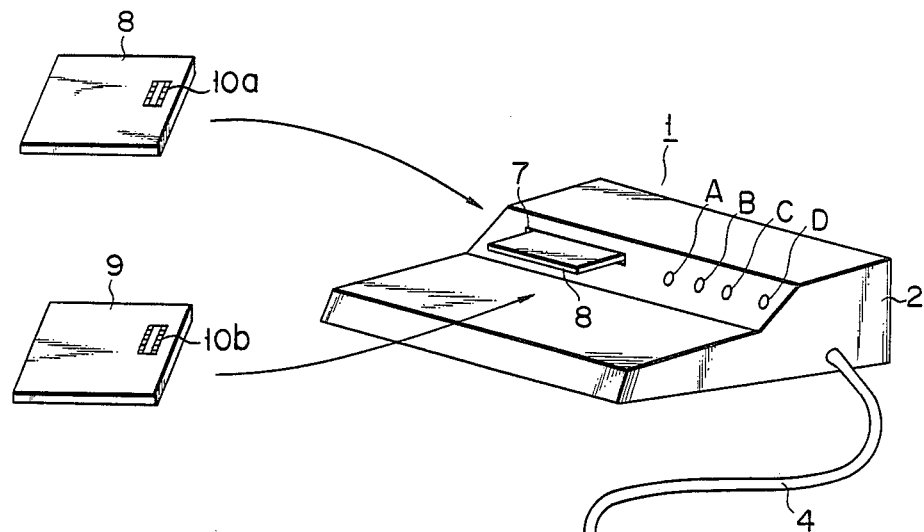
F I G. 1
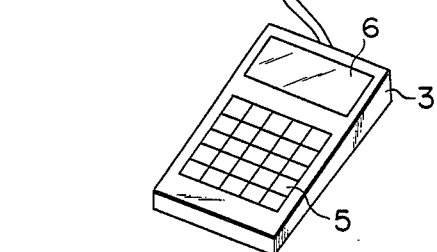
F I G. 2B
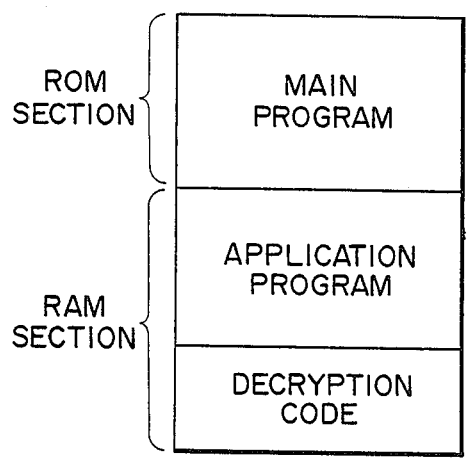

IC CARD SYSTEM

This application is a continuation of application Ser. No. 834,812, filed Feb. 28, 1986, now abandoned.

BACKGROUND OF THE INVENTION

The present invention relates to an IC card system with an IC card terminal.

When cash handling equipment such as an electronic cash register is used, a mechanical key lock mechanism is arranged to prevent a third party other than an authorized operator from using the equipment. In other words, the electronic cash register will not operate unless the authorized operator releases the key lock using a master key, thus preventing illegal use of the register.

A conventional key lock system of this type can also be applied to an IC card terminal which is used with an IC card.

The conventional key lock system, however, has the following drawbacks:

1. Since the key lock mechanism is a mechanical one, the key can be easily copied.

2. A key lock mechanism must be arranged independently of the mechanism inherent in the system, and thus the overall system becomes expensive.

3. Since the key must be held in a corresponding key slot to continuously release the key lock state while the system is being operated, the key may be stolen. In addition, the number of keys needed is the same as that of the IC card terminals.

In an IC card system, countermeasures against illegal use must be provided in the same way as for the electronic cash register. However, an effective countermeasure has not, so far, been realized.

SUMMARY OF THE INVENTION

It is an object of the present invention to provide an IC card system with an IC card terminal, which prevents a third party other than an authorized operator from making illegal use thereof and which is operated with security.

According to the present invention, there is provided an IC card system comprising: an IC card terminal; an initializing means which store data defining operation of the IC card terminal for initializing the IC card terminal; and a customer IC card used with the IC card terminal.

According to the present invention, there is further provided an IC card system comprising: an IC card terminal with first memory means for storing main program data used for a transaction with a customer, and second memory means for storing data defining initialization; an initializing means having an initializing memory for storing the initialization defining data to be supplied to the second memory means; and a customer IC card used for a transaction with a customer in combination with the IC card terminal.

BRIEF DESCRIPTION OF THE DRAWINGS

FIG. 1 is a perspective view showing an overall configuration of an IC card system according to an embodiment of the present invention;

FIG. 2B is an address data format of a memory in FIG. 2A;

DETAILED DESCRIPTION OF THE PREFERRED EMBODIMENT

Figure 2A:
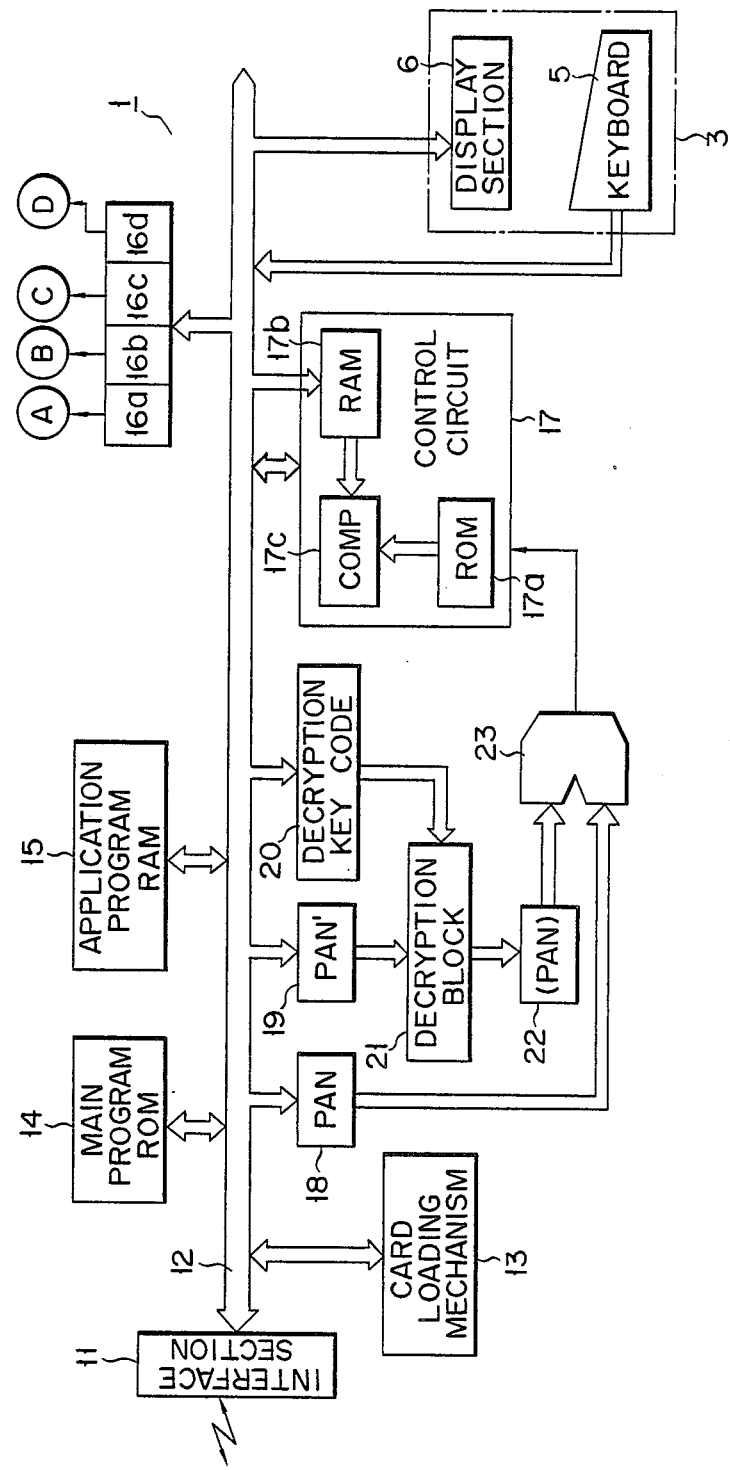
FIG. 2A is a block diagram showing a circuit arrangement of a terminal in FIG. 1.

An IC card system according to an embodiment of the present invention will be described in detail with reference to the accompanying drawings. In the following embodiment, application program data including system software and decryption code data is statically stored in an initializing memory arranged in an initializing IC card. At the time of system initialization, application program data is loaded in an IC card terminal. A transaction can then be performed using the customer IC card with the IC card terminal.

FIG. 1 is a perspective view showing an overall configuration of an IC card system according to an embodiment of the present invention. Referring to FIG. 1, IC card terminal 1 is divided into terminal body 2 and key input section 3. Body 2 is electrically connected to section 3 through cable 4. Keyboard 5 and display section 6 are arranged in section 3.

Body 2 has IC card insertion slot 7. Initializing IC card 8 and customer IC card 9 are selectively inserted in slot 7. FIG. 1 shows a state wherein card 8 is inserted in slot 7. Caution lamps A, B and C for indicating abnormal operations, and normal operation indicator lamp D are arranged on body 2. In this embodiment, assume that terminal 1 is installed in a store and that a customer with IC card 9 makes a credit purchase. Since body 2 is connected to section 3 through cable 4, the customer can input his personal identification number (PIN) without being watched by a store clerk standing near body 2. Connectors 10a and 10b are arranged on the surfaces of cards 8 and 9, respectively. When cards 8 and 9 are selectively inserted in slot 7, connectors 10a an 10b are electrically connected to connectors arranged in body 2, so that they are selectively coupled to an electronic circuit inside body 2. Section 3 also includes an alphanumeric input keyboard for entering transaction data, e.g., a total amount, an item name, the date of purchase, etc.

The electrical circuit arrangements of body 2 and cards 8 and 9 will be described with reference to the accompanying drawings.

The circuit arrangement of body 2 will be described with reference to FIG. 2A. Referring to FIG. 2A, interface section 11 has connectors which are to be connected to connectors 10a and 10b of cards 8 and 9. Section 11 is connected to system bus 12. Bus 12 is connected to card loading mechanism 13, for conveying card 8 or 9 inserted in slot 7 to a predetermined position in body 2 or for ejecting it from slot 7; main program ROM 14; application program data storage volatile RAM 15, lamp drivers 16a, 16b, 16c and 16d for driving lamps A to D; control circuit 17; registers 18, 19 and 20; keyboard 5 of section 3; and display section 6. Circuit 17 includes ROM 17a, RAM 17b and comparator 17c. These circuits discriminate whether the IC card inserted in slot 7 is card 8 or 9. For example, in ROM 17a is prestored code data representing the type of IC card. The corresponding code data is stored in cards 8 and 9. The code data read out from cards 8 and 9 is temporarily stored in RAM 17b, and is then compared with the data from ROM 17a by comparator 17c. When a coincidence between them is established, circuit 17 determines the type of IC card inserted in slot 7.

All the access program for card 9 is loaded from card 8 into RAM 15 of terminal 1. But, a part of the access program may be preset in ROM 14. In this case, the remaining part of the card access program is loaded in RAM 15 from card 8, and circuit 17 performs addressing through ROM 14 and RAM 15. FIG. 2B shows an address data format for addressing ROM 14 and RAM 15 by circuit 17. The ROM section correspond to ROM 14, and the RAM section corresponds to RAM 15.

A primary account number (PAN) and encrypted data PAN' read out from card 9 are stored in registers 18 and 19, respectively. Decryption key code data is read out from card 8 and is stored in register 20. Data PAN' and the decryption key code data, respectively stored in registers 19 and 20, is supplied to decryption block 21. Block 21 decrypts data PAN' in accordance with the decryption key code data to obtain data PAN. The decrypted data PAN is stored in register 22 and is supplied to one input terminal of comparator 23. Data PAN stored in register 18 is supplied to the other input terminal of comparator 23 wherein data PAN from register 22 is compared with data PAN from register 18 by comparator 23. A comparison result is supplied to circuit 17. The connectors arranged in section 11 and mechanism 13 can be constituted by those described in U.S. patent application Ser. No. 782,518.

Figure 3:
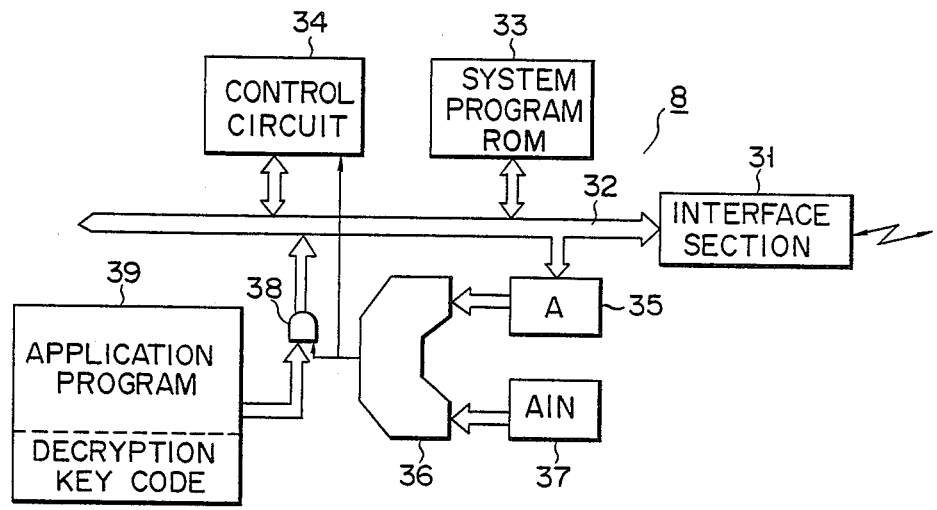
FIG. 3 is a block diagram showing a circuit arrangement of an initializing IC card in FIG. 1.

FIG. 3 shows the circuit arrangement of card 8 of FIG. 1. Interface section 31 has connector 10a. Section 31 is connected to other circuits through system bus 32. Bus 32 is connected to a ROM 33 storing system program data, a control circuit 34 including a CPU, and a register 35. Register 35 stores an administration identification number (AIN) entered at key input section 3. Input data AIN is supplied to one input terminal of comparator 36. Prestored data AIN is supplied from AIN memory 37 to the other input terminal of comparator 36. Memory 37 is constituted by, for example, a PROM such as EPROM or EEPROM. The PROM stores any AIN data entered by an administrator, i.e., an authorized store clerk, for terminal 1. Comparator 36 then compares the content of register 35 with that of memory 37. A comparison result is applied to circuit 34 and to one input terminal of AND gate 38. Application program data and decryption key code data are prestored in data ROM 39. The application program data is data to be preset in terminal 1 to excite various transaction operations for card 9. The contents of the application program will be descibed below. The decryption key code data is the code data for decrypting the encrypted data read out from card 9. When a coincidence signal is generated by comparator 36, the data from ROM 39 is supplied to interface section 31 through gate 38 and system bus 32, and to terminal 1 through section 31.

The application program is defined as a program for executing customer IC card processing such as a customer's arbitrary PIN registration at the time of issuance of a new customer IC card, re-registration of the registered PIN, a transaction data check operation, a card check operation, and the like.

Figure 4:
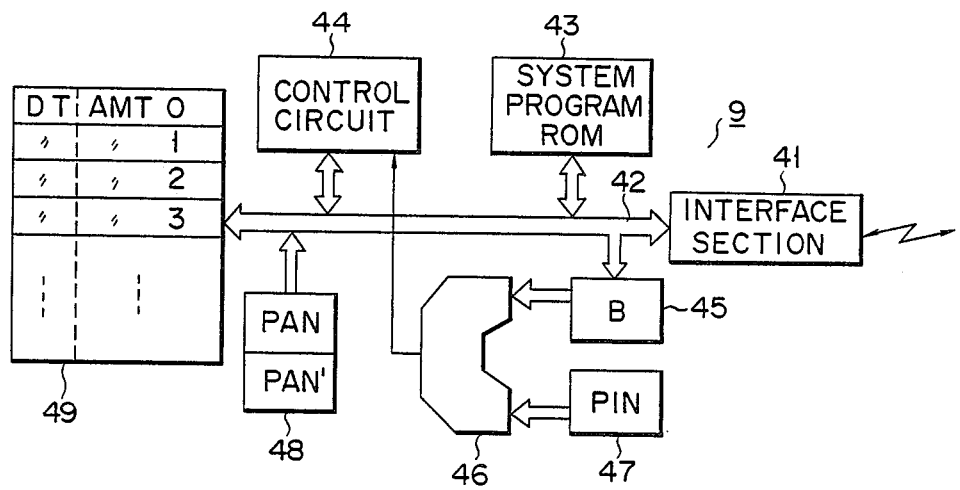
FIG. 4 is a block diagram showing a circuit arrangement of a customer IC card in FIG. 1.

FIG. 4 shows the circuit arrangement of card 9. Referring to FIG. 4, interface section 41 has a connector 10b of FIG. 1. Section 41 is connected to internal electronic circuits in card 9 through system bus 42. Bus 42 is connected to system program ROM 43, control circuit 44 and register 45. Customer PIN entered at keyboard 5 is stored in register 45. This PIN data is supplied to one input input terminal of comparator 46. Data PIN from memory 47 is supplied to the other input terminal of comparator 46. Memory 47 comprises, for example, a PROM such as EPROM or EEPROM. Comparator 46 compares the input PIN data from register 45 with the PIN data readout from memory 47. A comparison result is supplied to control circuit 44.

PAN memory 48 and data memory 49 are also coupled to bus 42. Memory 48 comprises, for example, a PROM such a EPROM EEPROM. Memory 48 stores customer account number PAN and data PAN' obtained by encrypting data PAN according to the RSA encryption method. Memory 49 also comprises a PROM such as EPROM or EEPROM. Memory 49 sequentially stores a date (DT) data of purchase and total amount AMT.

Figure 5:
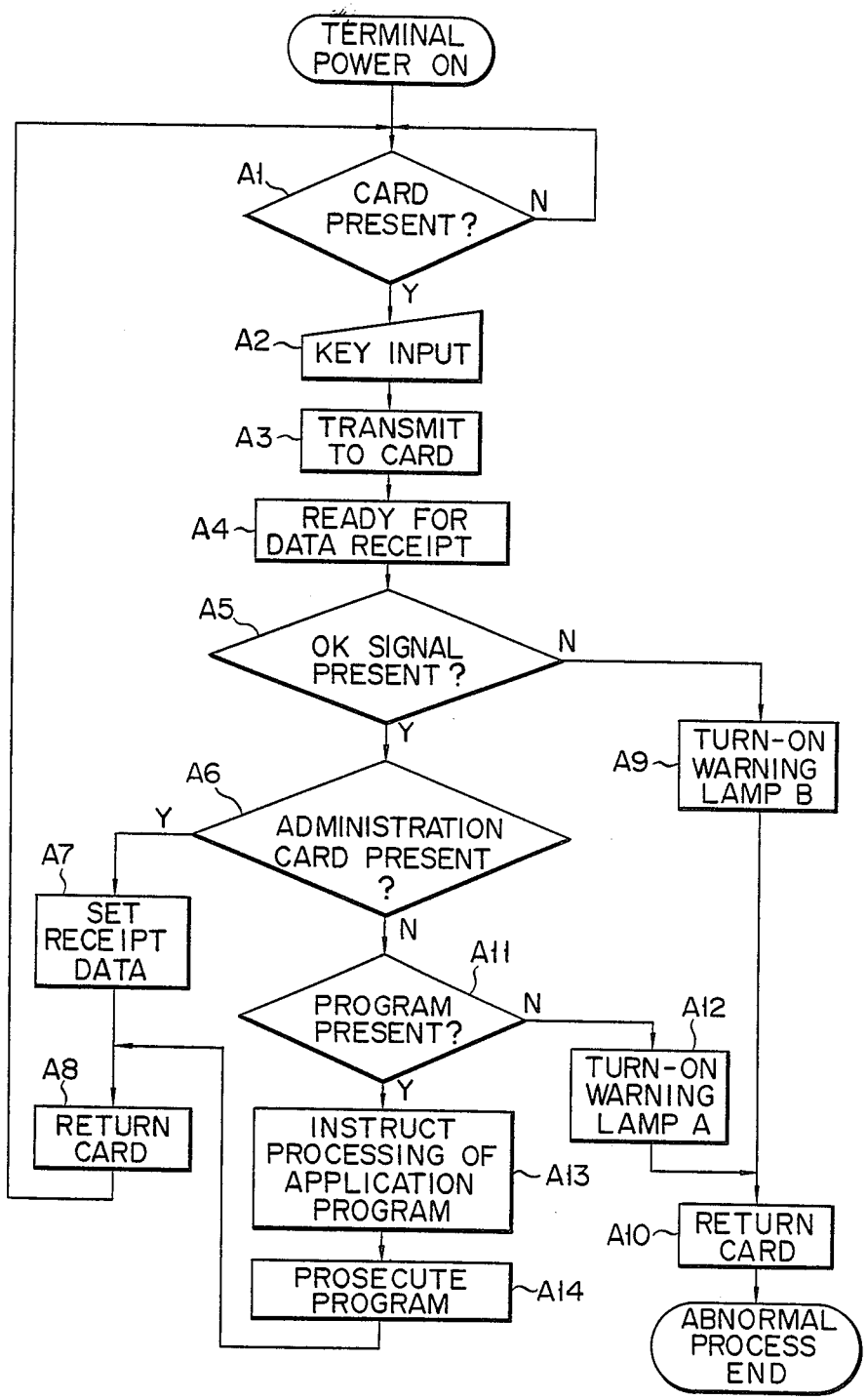
FIGS. 5 to 8 are flow charts for explaining the operations of the IC card system in FIG. 1.

The operation of the arrangements shown in FIGS. 1 to 4 will be described with reference to flow charts of FIGS. 5 to 8. When a terminal power switch (not shown) in the terminal in FIG. 1 is turned on, circuit 17 is operated in accordance with the main program stored in ROM 14 in FIG. 2A, and processing shown in the flow chart of FIG. 5 is executed. At the time of power ON, the storage contents of RAM 15 are lost, and terminal 1 thus does not have a processing function for card 9.

Circuit 17 determines in step A1 of FIG. 5 whether or not an IC card is inserted in slot 7. If NO in step A1, circuit 17 waits until an IC card is inserted in slot 7. However, if YES in step A1, the flow advances to step A2 and circuit 17 awaits a key input. When data PIN is entered at keyboard 5 of section 3, the input PIN data is transmitted to the IC card in step A3. Circuit 17 then awaits data fom the IC card in step A4. When signal data is set back from the IC card, the flow advances to step A5. Circuit 17 checks in step A5 whether the signal from the IC card is an OK signal.

Figure 6:
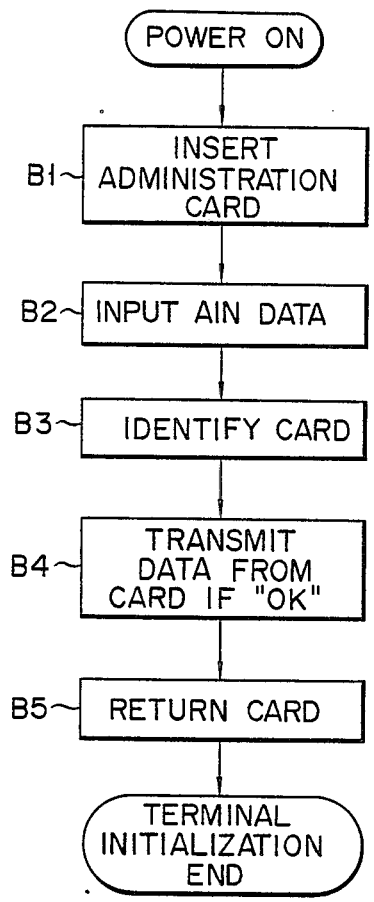

In a store, card 8 is inserted in slot 7 in step B1 of FIG. 6 after a power switch of terminal 1 is turned on. In step B2, the AIN data is entered at section 3. The input AIN data from section 11 is supplied to section 31 of card 8 in step A3 of FIG. 5 and is set in register 35. When the AIN data is sent from terminal 1 to card 8, comparator 36 compares in step B3 of FIG. 6 the data set in register 35 with the AIN data prestored in memory 37 to check whether a coincidence therebetween is established. In other words, comparator 36 checks whether or not the user of card 8 is an authorized user. If YES in step B3, a coincidence signal from comparator 36 enables gate 38. In step B4, the application program data and the decryption key code data are sequentially read out from ROM 39. Both of the data from ROM 39 are supplied to terminal 1 through section 31. When OK data is transmitted from card 8 to terminal 1, the flow advances to step A6 in FIG. 5 to check whether the reception data is data from card 8. If YES in step A6, the flow advances to step A7. The reception data is stored in memory 15. In terminal 1, the application program data from card 8 is stored in RAM 15, and the decryption key code data is set in register 20. Thereafter, as shown in step A8 of FIG. 5 and step B5 of FIG. 6, card 8 is ejected from slot 7, and terminal initialization is completed.

When initialization of terminal 1 is completed, processing for card 9 can be performed. If NO in step A5 of FIG. 5, the flow advances to step A9, and caution lamp B is turned on by driver 16b to indicate that the input AIN does not coincide with the prestored AIN. Thereafter, card 8 is returned in step A10, and abnormal processing is completed.

As described above, after the application program data is stored in RAM 15, and the decryption key code data is written in register 20, processing for card 9 can be performed. In this state, when the customer inserts his card 9 through slot 7 and enters his own PIN, the PIN comparison is performed and the validity of card 9 is checked as will be described later. If the OK signal cannot be obtained, the flow advances from step A5 to step A9 in FIG. 5. However, if the OK signal is detected, the flow advances to step A11 through step A6. Circuit 17 checks in step A11 whether the application program data is already written in RAM 15. When card 9 is used without setting the application program data in card 8 upon energization of terminal 1, the decision step A11 is determined to be NO. The flow advances to step A12, and driver 16a is driven to turn on lamp A, thereby signalling to the customer that the data is not set in card 8. In step A10, card 9 is ejected from slot 7 and is returned to the customer.

However, when circuit 17 determines in step A11 that the application program data and the decryption code data are set in RAM 15, the flow advances from step A11 to step A13. The application program processing is designated, and item purchase processing (application program processing in FIG. 8 to be described later) in step A14 is performed. Thereafter, the flow advances to step A8, and card 9 is returned to the customer. Finally, the flow returns to step A1.

Figure 7:
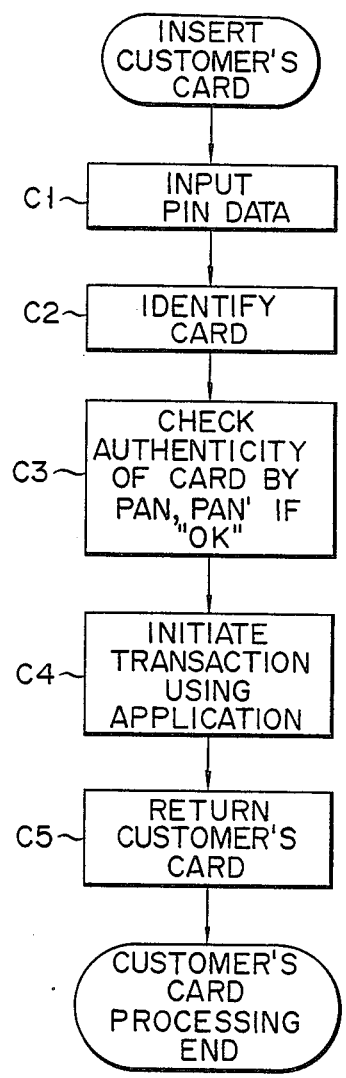
Figure 8:
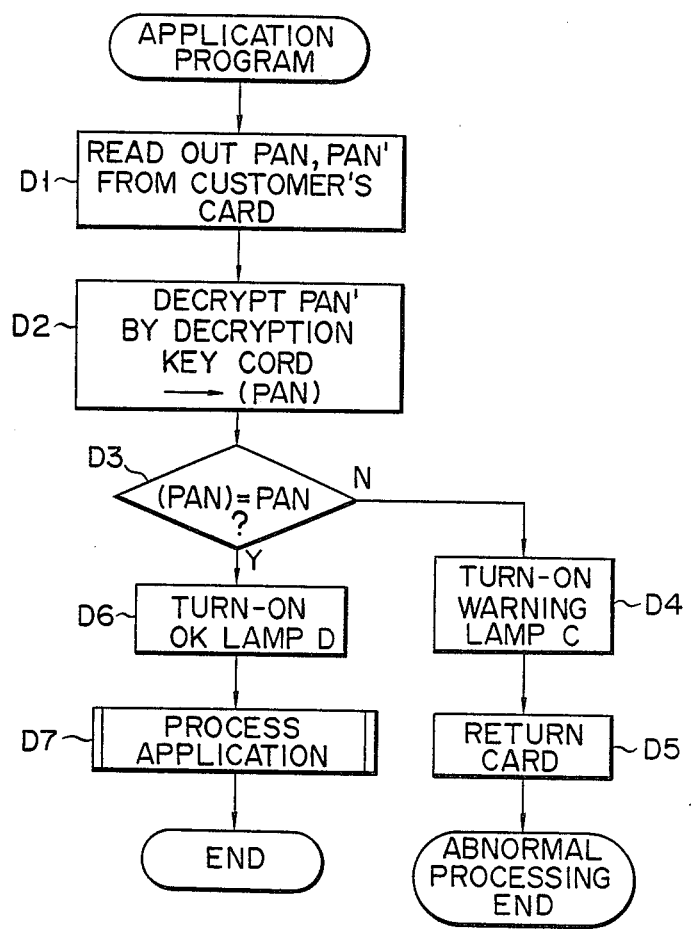

When the customer purchases an item, he inserts card 9 in slot 7 of terminal 1 installed in a store and enters his own PIN at section 3, as shown in step C1 of FIG. 7. The input PIN is transmitted from section 11 to card 9 and is set in register 45 through section 41 and bus 42. When the PIN is set in register 45, the flow advances to step C2, and comparator 46 in card 9 compares the input PIN set in register 45 with the prestored PIN read out from memory 47. When a coincidence signal is generated by comparator 46, the OK signal is transmitted from circuit 44 to terminal 1 through section 41. When the OK signal from card 9 is received by terminal 1, terminal 1 checks validity of card 9 in step C3. In order to check the validity, terminal 1 reads out the personal account number PAN from memory 48 of card 9 and encrypted personal account number PAN' in step D1 in FIG. 18. The PAN data and the PAN' data are stored in registers 18 and 19, respectively. The flow advances to step D2. Encrypted personal account number PAN' is supplied from register 19 to block 21. Encrypted PAN' is decrypted in accordance with the decryption key code set in register 20. The decrypted personal account number (PAN) is stored in register 22. In step D3, the decrypted personal account number (PAN) written in register 22 is compared by comparator 23 with the personal account number PAN held in register 18. A comparison result is supplied to circuit 17. Circuit 17 discriminates in step D3 whether the PAN from register 22 coincides with that from register 18. If NO in step D3, the flow advances to step D4. Driver 16c is operated to turn on lamp C, thereby indicating that card 9 is invalid. In step D5, card 9 is returned to the customer, and abnormal processing is thus completed. When the coincidence signal is generated by comparator 23, the flow advances from step D3 to step D6, and driver 16d is driven to turn on OK lamp D. Subsequently, as shown in step D7 of FIG. 8 and step C4 of FIG. 7, application processing is performed. Date DT data of purchase and total amount AMT data are recorded in memory 49 in card 9. At the same time, the registration number of card 9 and the total amount are stored in terminal 1. The contents of memory 49 can be read out and displayed on display section 6, as needed. Thus, processing for card 9 is completed.

In the above embodiment, the IC card is exemplified by a credit card. However, the IC card can also be used in other card systems such as a bank card.

In the embodiment of FIG. 1, cards 8 and 9 are inserted in the same slot 7. The slot 7, however, can be used to only receive the customer card 9. In this case, the card 8 may be inserted in another slot (not shown) formed on the body 2 of terminal 1.

Since, customer card 9 may be formed in accordance with the ISO standard, the slot 7 of FIG. 1 should also be formed in accordance with the ISO standard. The card 8 and the slot for receive the card 8, however, need not be formed in accordance with the ISO.

According to the present invention as described above, a terminal initialization IC card is prepared. System software and/or personal identification data are supplied from the IC card to the terminal at the time of initialization of the IC card terminal. In this state, the IC card terminal can communicate with the customer IC card. The initialization IC card and the customer IC card can be operated by the same interface, thus eliminating a special locking mechanism. Furthermore, since the initialization IC card is used only for initialization, only one initialization IC card is required for a plurality of terminals. Since the personal identification data or the like is supplied to the initialization IC card, secrecy and security can be assured even if the terminal is stolen. Since the personal identification IC card, the identification data can be easily added or modified. As is apparent from the above description, illegal use of IC cards and IC card terminals by third parties other than authorized operators can be prevented, thus providing high security.

What is claimed is:
1. An IC card system comprising:
initializing means for initializing an IC card terminal means, including first memory means for storing an application program;
customer IC card means; and
an IC card terminal means including:
second memory means for storing the application program received from said initializing means;
means for determining whether or not the application program is stored in said second memory means;
means for accessing said customer IC card means when said determining means judges the application program is stored in said second memory means; and
means for performing a transaction with said customer IC card means in accordance with the application program supplied from said initializing means.

2. A system according to claim 1, wherein said application program stored in the first memory means is a part of an entire application program for causing said IC card terminal means to access said customer IC card means, and said application program stored in said second memory means is the remaining part of the entire application program, whereby a transaction with said customer IC card means is enabled by the combination of both the application programs stored in the first memory means and second memory means.

3. A system according to claim 1 wherein said initializing means further includes third memory means for storing terminal administrator identification number (AIN) data, and first comparing means for comparing said AIN data with AIN data entered at said terminal means,
and further comprising means for transferring said application program stored in the first memory means of said initializing means to the second memory means of said IC card terminal means when a coincidence is detected by said first comparing means.

4. A system according to claim 3, wherein said IC card terminal means further includes fourth memory means for storing decryption key code data, decrypting means for decrypting predetermined encrypted data in accordance with the decryption key code data, second comparing means for comparing data decrypted by the decrypting means with the predetermined encrypted data, and said initializing means further includes fifth memory means for storing the decryption key code data supplied to the fourth memory means.

5. A system according to claim 4, wherein said customer IC card means includes means for transmitting encrypting data and encrypted data to said terminal means,
whereby the transmitted encrypting data is compared with data decrypted by the decrypting means by said second comparing means to authenticate said customer IC card means.

6. A system according to claim 5, wherein an encryption algorithm is an RSA algorithm, and the decryption key code is a public key.

7. A system according to claim 5, wherein said terminal means further comprises noncoincidence indicating means for receiving a noncoincidence signal when said first comparing means detects a noncoincidence.

8. A system according to claim 1, wherein said initializing means comparises an initializing IC card, and said customer IC card means comprises a customer IC card.

9. An IC card system comprising:
IC card terminal means including first memory means for storing a main program used for performing a transaction with a customer, second memory means for storing decryption key code data, decrypting means for decrypting predetermined encrypted data in accordance with said decryption key code data, and first comparing means for comparing data decrypted by the decryption means with the predetermined encrypted data;
initializing means for initializing said IC card terminal means including third memory means for storing said decryption key code data for supply to said second memory means, fourth memory means for storing terminal administrator identification number (AIN) data, second comparing means for comparing the AIN data with AIN data entered at said terminal means, and means for transferring said decryption key code data stored in the third memory means of said initializing means to said second memory means of said IC card terminal means when a coincidence is detected by said second comparing means; and
customer IC card means for performing a transaction with a customer in combination with said IC card terminal means,
said IC card terminal means further including means for distinguishing the customer IC card means from the initializing means, and means for accessing said customer IC card means when said distinguishing means determines that a card inserted into the IC card terminal means is the customer IC card.

10. A system according to claim 9, wherein said customer IC card means includes means for transmitting encrypting data and encrypted data to said terminal means,
whereby the transmitted encrypting data is compared with data decrypted by the decrypting means by said second comparing means to authenticate said customer IC card means.

11. A system according to claim 10, wherein an encryption algorithm is an RSA algorithm, and the decryption key code is a public key.

12. A system according to claim 11, wherein said terminal means further comprises noncoincidence indicating means for receiving a noncoincidence signal when said first comparing means detects a noncoincidence.

13. A system according to claim 9, wherein said initializing means comprises an initializing IC card, and said customer IC card means comprises a customer IC card.

14. A system according to claim 13, wherein said initializing IC card and customer IC card are prepared in conformity with the ISO standard, and said IC card terminal means has a card receiving port commonly used for both said initializing and customer cards.

15. An IC card system comprising:
IC card terminal means including first memory means for storing a main program used for a transaction with a customer and second memory means for storing data defining initializing; and
initializing means including third memory means for storing the data defining initialization for supply to the second memory means, fourth memory means for storing terminal administrator identification number (AIN) data, and first comparing means for comparing the AIN data with AIN data entered at said terminal means; and
customer IC card means for performing a transaction with a customer in combination with said IC card terminal means;
whereby the data defining initialization stored in said third memory means is transferred into said second memory means of said IC card terminal means when a coincidence is detected by said first comparing means.

16. A system according to claim 15, wherein the data defining initialization is an application program for a customer.

17. A system according to claim 15, wherein the data defining initialization is a part of a program for causing said terminal means to access said customer IC card means.

18. A system according to claim 15, wherein the data defining initialization includes decryption key code data,
said terminal means includes decrypting means and second comparing means for comparing data decrypted by said decrypting means with predetermined encrypted data, and said initializing IC card means includes means for transmitting encrypting data and encrypted data to said terminal means.

19. A system according to claim 18, wherein an encryption algorithm is an RSA algorithm, and the decryption key code is a public key.

20. A system according to claim 15, wherein the data defining initialization includes an application program for a customer and decryption key code data, and said terminal means includes decrypting means and comparing means for comparing the decrypted data from said decrypting means with predetermined encrypted data.

21. A system according to claim 20, wherein an encrypting algorithm is an RSA algorithm, and the decryption key code is a public key.

22. A system according to claim 15, wherein said data defining initialization is a part of a program for causing said terminal means to access said customer IC card means, said data defining initialization includes decryption key code data;

said terminal means includes decrypting means and comparing means for comparing decrypted data from said decrypting means and predetermined encrypted data, and said customer IC card includes means for transmitting encrypting data and encrypted data to said terminal.

23. A method of using IC card means, comprising the steps of:

applying initializing means for a terminal administrator into IC card terminal means;

loading into the IC card terminal means an application program for a customer from the initializing means so as to perform application service for a customer IC card holder in said IC card terminal means;

applying customer IC card means into said IC card terminal means;

determining whether or not the application program is loaded in the IC card terminal; and accessing predetermined processing for the customer IC card means on the basis of said application program.

24. A method according to claim 23, wherein AIN data is entered with the applied initializing means in said IC card terminal means and is identified, and a next step is initiated when a coincidence signal is obtained.

25. A method according to claim 23, wherein said application program data provided in the initializing means for loading into the IC card terminal means is a part of a program for accessing the customer IC card in said terminal, and said terminal means receives said application program to execute the program for the customer IC card.

26. A method of using IC card means comprising the steps of:

applying initializing means for a terminal administrator into an IC card terminal means;

comparing administrator identification number (AIN) data stored in said initializing means with AIN data entered at said terminal means;

loading decryption key data into said IC card terminal means from the initializing means;

applying a customer IC card means in said IC card terminal means;

distinguishing said customer IC card means from said initializing IC card means:

transferring encrypting data and encrypted data from said customer IC card means to said terminal means;

decrypting said encrypted data transferred from said customer IC card means in accordance with said loaded decryption key data from the initializing means; and comparing said decrypted data with said encrypting data transferred from said customer IC card means so as to determine validity of the customer IC card.

27. A method according to claim 26, further including the step of indicating whether said IC card means is valid or not.

28. An IC card system comprising:

an IC card terminal including programmable data processing means for executing processing operations of a customer IC card under control of an application program, and first memory means for storing said application program;

initializing means including a second memory means for storing at least a portion of said application program, means for verifying whether a user of the initializing means is authorized, and means for setting the IC card terminal from a non-operational state in which at least a part of said first memory has been cleared into an operational condition to process a customer IC card by transferring the at least a portion of said application program from said second memory into at least said part of the first memory only when authorization of said user is verified;

wherein said IC card terminal processes a customer IC card means under control of the application program at least a portion of which has been input to the card terminal from said initializing means.

* * * * *